United States Patent
Pirkl

(10) Patent No.: US 7,767,954 B2
(45) Date of Patent: Aug. 3, 2010

(54) PROCESS AND DEVICE FOR MONITORING THE SECURITY OF A PASSAGEWAY USING AN OPTICAL GRID TO MONITOR MOVEMENT OF OBJECTS ON A CARRIER

(75) Inventor: Klaus Pirkl, Büttelborn (DE)

(73) Assignee: Sick AG, Waldkirch (DE)

( * ) Notice: Subject to any disclaimer, the term of this patent is extended or adjusted under 35 U.S.C. 154(b) by 49 days.

(21) Appl. No.: 12/010,485

(22) Filed: Jan. 25, 2008

(65) Prior Publication Data

US 2008/0179506 A1    Jul. 31, 2008

(30) Foreign Application Priority Data

Jan. 26, 2007    (EP) .................................. 07001788

(51) Int. Cl.
*G06M 7/00* (2006.01)
*G01N 21/86* (2006.01)

(52) U.S. Cl. .................... 250/221; 250/559.12

(58) Field of Classification Search ............. 250/221, 250/223 R, 222.1, 559.12, 559.13, 559.15, 250/559.19, 559.22; 340/540, 541, 552, 340/555–557, 573.1, 600, 506, 507; 356/625, 356/628; 209/576–581, 586, 587; 361/170, 361/173–17

See application file for complete search history.

(56) References Cited

U.S. PATENT DOCUMENTS

| | | | |
|---|---|---|---|
| 6,784,415 B2 * | 8/2004 | Kudo et al. | 250/221 |
| 6,979,814 B2 | 12/2005 | Kudo et al. | |
| 7,034,280 B2 * | 4/2006 | Beck et al. | 250/221 |
| 2003/0146373 A1 * | 8/2003 | Kudo et al. | 250/221 |
| 2003/0218122 A1 * | 11/2003 | Haberer et al. | 250/221 |

FOREIGN PATENT DOCUMENTS

| | | | |
|---|---|---|---|
| DE | 10 2004 038 906 | | 3/2006 |
| EP | 1 329 662 | | 7/2003 |
| EP | 1873442 | * | 1/2008 |

* cited by examiner

*Primary Examiner*—Thanh X Luu
*Assistant Examiner*—Pascal M Bui-Pho
(74) *Attorney, Agent, or Firm*—The Nath Law Group; Jerald L. Meyer; Stanley N. Protigal

(57) ABSTRACT

Monitoring is provided, for a passageway through which objects on carrier (12) are transported, such that the passageway is guarded by at least one light grid (16) with a plurality of light rays running one above the other, where the light grid (16) is divided into a first, lower area (16a) through which the carriers (12) pass and a second, upper area (16b) through which the objects pass, which light grid (16) disposes over an evaluating circuit which emits a signal if a light ray (22) is interrupted in the first, lower area (16a) and provides information on the height of the object. A current value for the height is stored height as last measured value. Readouts are taken of a lower area (16a) and upper area (16b) of the light grid (16), and the readouts are used to determine a current value for the height of the object, and a determination is made whether an object flag has been changed.

19 Claims, 3 Drawing Sheets

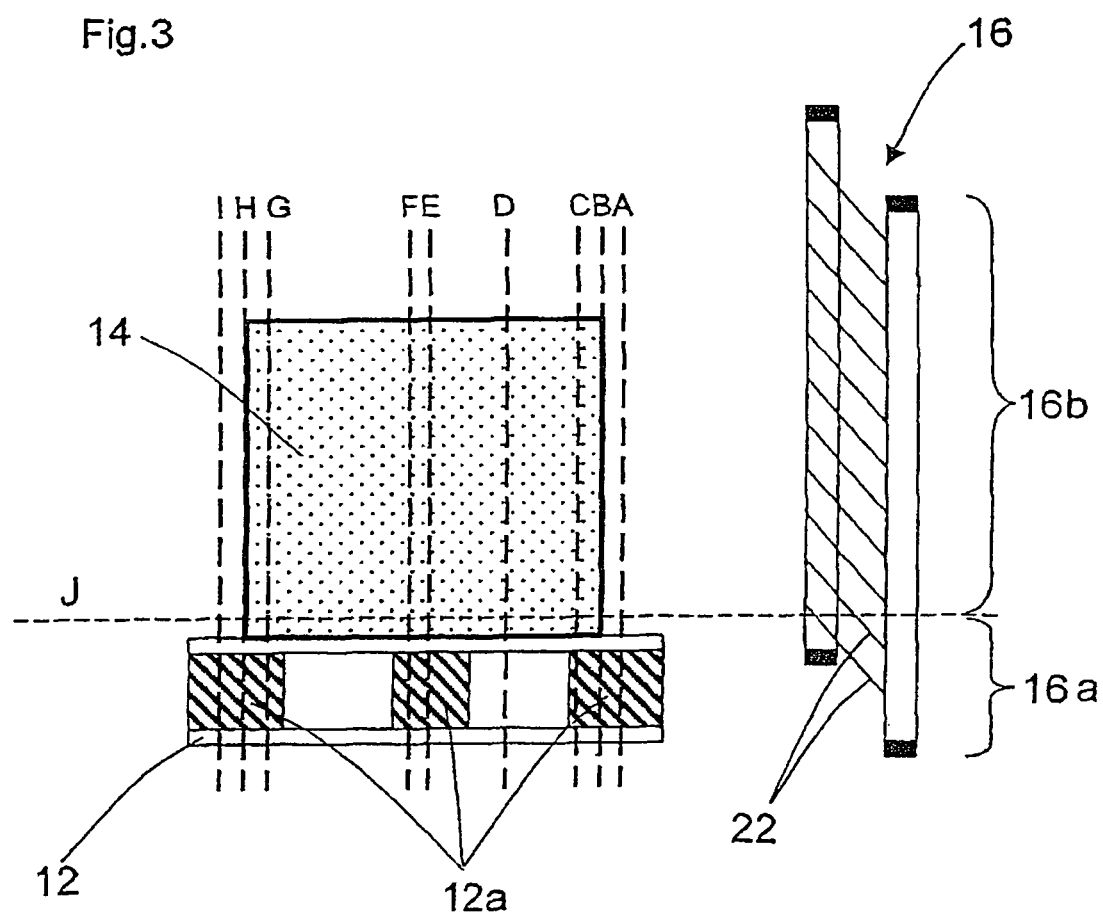

Figure 1:
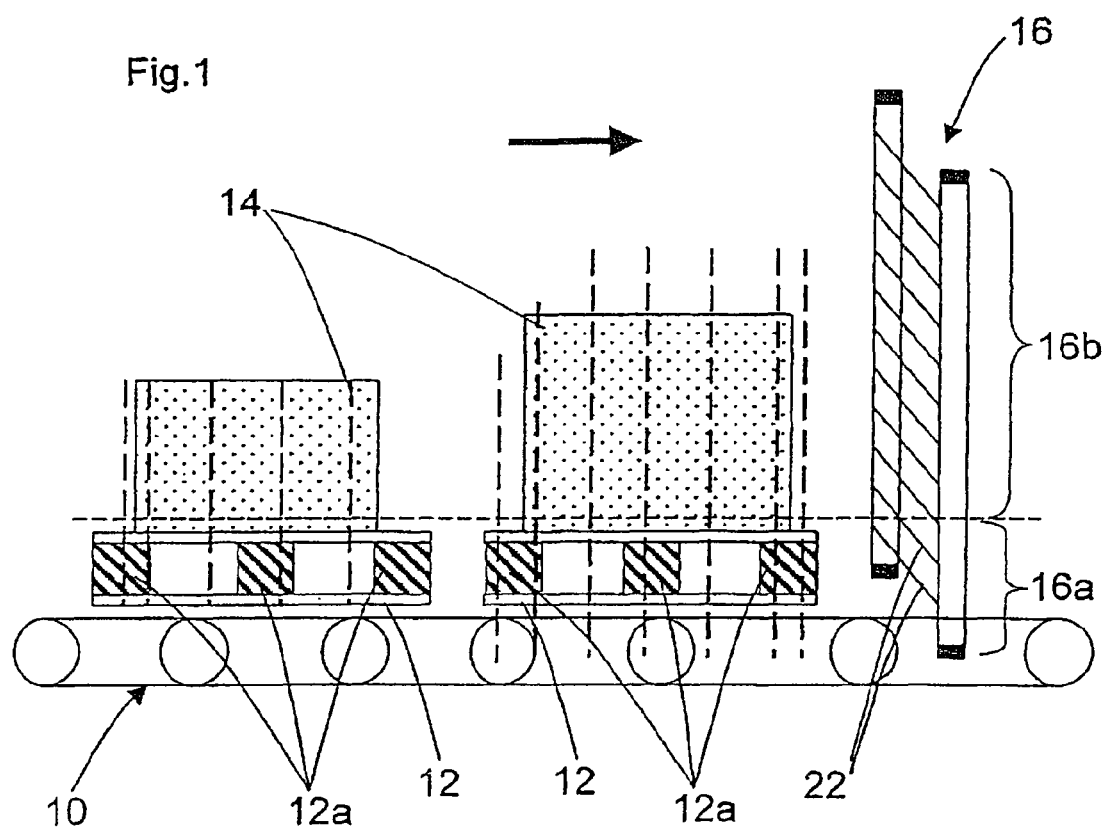

PROCESS AND DEVICE FOR MONITORING THE SECURITY OF A PASSAGEWAY USING AN OPTICAL GRID TO MONITOR MOVEMENT OF OBJECTS ON A CARRIER

The invention relates to a process for monitoring the security of a passageway and to a device for implementing this process.

These known processes and devices serve to protect passageways through which certain objects enter or leave a protected area, in cases where it is desirable to prevent the entrance or exit of unauthorized objects and persons. Applications would include the safeguarding of access to automated manufacturing facilities; the securing of entranceways to flexible manufacturing cells; the surveillance of mechanical press brakes and palletizing equipment; also, transport technology, shipping and storage technology, the packaging industry, machine construction, and the automobile industry.

It is known to protect such passageways with a light grid in which transmitting units positioned one on top of the other transmit light rays received by receiving units arranged in comparable fashion. The disruption of these light rays signals the passage of an object. If an unauthorized object passes through the light grid, a security feature, e.g., an alarm, is triggered and, e.g., dangerous manufacturing equipment is shut off. A so-called muting process is used to permit the passage of admissible objects through the protected passageway. Here an authorized object is identified and the security feature is suppressed, or the object gated out, if the light grid is being traversed by an object identified as an admissible one.

It is known from DE 103 15 667 A1 to position other light barriers in front of the light grid in order to implement the muting function of the light grid upon passage of an object. In the case of an admissible object, this object will be able pass through the light grid if the pre-positioned light barrier is disrupted by the object. As a result, the admissible object will pass through the light barrier without triggering the security feature. Here a suitable delay interval can be employed. On the other hand, if, e.g., a person passes through the pre-positioned light barrier, the latter is set off before the person passes through the light grid and the muting function is terminated in timely fashion, before that person passes the light grid. The security feature is triggered. The additional light barriers positioned in front of and behind the light grid enlarge the dimensions of the security device in the object's direction of transit. The placement of the light barriers in front and behind depends on the dimensions of the admissible objects and on the transport speed, so that only those objects can be protected that sufficiently differ from unauthorized objects, particularly the human body.

Known from DE 103 29 881 A1 is a process and a device of the initially mentioned type, in which an object passing through the light grid is scanned by rays which are positioned one on top of the other. A position sensor placed in front of the light grid indicates when an object is passing through the light grid. The bit pattern of disrupted and undisrupted light rays from the light grid are recorded at predetermined intervals and are compared with stored bit patterns for the admissible object. If the bit patterns agree, the triggering of the security feature is suppressed. If there are deviations from the stored bit pattern, the security feature is triggered. The timed scanning process and the comparison with the stored bit patterns presuppose that the object is transported through the light grid at a predetermined speed. For a light grid with a large number of light rays positioned one above the other, e.g., about 200 light rays, and a higher speed of passage, this process requires a greater storage capacity for the deposited bit patterns and a greater expense to provide the rapid comparison of detected bit patterns with those stored in the device.

Known from the still unpublished European patent application EP 06 013 298 is a method and a device which permit a considerable reduction in the expense of image comparison. Here the signals from a light grid are recorded as a linear object-bit pattern and are compared with the reference bit patterns for an admissible object (14), as stored in an evaluating unit. A security feature is triggered if the light grid is interrupted. The triggering of this security function is suppressed (muting) if the recorded object bit patterns agree with the stored reference bit patterns. In identifying the object, the uppermost and/or lowermost blocked light rays are evaluated and are compared for agreement with the stored reference bit patterns.

A problematic feature of this process rests in the fact is that there must be exact agreement, at least within certain tolerance limits, between the patterns for each example from a class of admissible objects. If, e.g., cartons positioned on pallets are recorded, not only would each carton have to be standardized (as explained in greater detail below), but the carton would also have to be positioned with sufficient precision to insure the successful operation of the system.

All the described solution thus have the weighty disadvantage of showing extremely little flexibility vis-à-vis a rapid variation in the type of object moving through the passageway guarded by the light grid.

The invention is based on the problem of creating a process and a device to safeguard a passageway while guaranteeing a high degree of reliability at only slight expense and at the same time of permitting improved flexibility with respect to the processing of admissible objects of divergent form and shape.

SUMMARY

A passageway through which objects on carrier 12 are transported, is monitored. The monitoring is such that the passageway is guarded by at least one light grid 16 with a plurality of light rays running one above the other, where the light grid 16 is divided into a first lower area 16a through which the carriers 12 pass and a second, upper area 16b through which the objects pass, which light grid 16 disposes over an evaluating circuit which emits a signal if a light ray 22 is interrupted in the first, lower area 16a and provides information on the height of the object. The monitoring is performed by the following steps:

a) storing the current value for the height as last measured value;

b) reading of the first, lower area 16a of the light grid 16 to determine whether a carrier 12 has passed through the light grid 16 and reading of the second, upper area 16b of the light grid 16;

c) determining a new current value for the height of the object from the data read out from the second, upper area 16b of the light grid 16;

d) setting an object flag to indicate that an object is located within the light grid 16 if the last measured value has a value of zero within a tolerance range and the current measured value differs from zero within a tolerance range, cancellation of the object flag if the last measured value differs from zero within the tolerance range and the current measured value has a value of zero within the tolerance range, and determination of whether the object flag has been changed;

e) setting a carrier flag when a carrier 12 is detected in the first, lower area 16a of the light grid 16 and cancellation of the carrier flag when no carrier 12 is detected in the first, lower area 16a of the light grid and no object flag is set;

f) examining whether the current measured value and the last measured value satisfy a predetermined condition and reversion to step a) if this is the case and if a carrier flag is set;

g) reverting to step a) when the carrier flag is set and the object flag was changed; and h) executing the security function when a light ray 22 from the second, upper area 16b of the light grid 16 is interrupted.

The invention is based on the realization that from a combination of information obtained by comparing the position (specifically, the height) of successive contour points defined by the highest blocked or lowest unblocked ray with information derived from an area scanned by a light grid it is possible to provide effective security surveillance of a passageway, without the need for a complete comparison of contours or comparison employing a complete linear contour.

In accordance with the invention, the light grid is divided into two partial areas for the purpose of evaluation. All objects are muted in a first, lower area, which lies below a horizontal limit line. As a result, these objects never trigger the security feature.

The feature can only be triggered when an object disrupts a ray path in a second portion of the light grid, which lies above the limit line. As specified by the invention, the information provided by this portion of the light grid regarding the passage of an object has already been brought into relation with the last previously measured value and is used as a criterion to determine whether a disruption in the second area of the light grid lying above the limit line is permitted, i.e., is one that will not lead to a triggering of the security feature and that is therefore to be muted.

Information from the first, lower area of the light grid is employed as a second criterion for the decision on whether the security function is to be triggered. This information may be, e.g., information on whether a carrier had entered the light grid before the first signal is measured in the second, upper area—which would indicate the orderly introduction of an object and would result in muting; or not—which would mean that the security function is triggered.

In the system according to the invention, surveillance is detached from the need for explicit shape recognition, since it is the momentary point on the contour of the object that is recorded, i.e., the blocked uppermost light ray, and that is compared with the previously detected value in the evaluating unit and is processed on the basis of selectable logical rules.

This comparison of the successive changes in the object's contour makes shape identification independent of the transit speed of the scanned object and also independent of the object's concrete shape; it also reduces storage requirements and the expense required for 'learning' the admissible objects. Instead of the need to learn a contour line for each individual admissible object, the system only requires the input of a general criterion, which is fulfilled by adjacent points on the contour lines of an entire class of admissible objects.

Thus the expense involved in storage and evaluation is consistently reduced, even for a light grid with a large number of light rays (and consequently with a high resolution), and a high transit speed for the objects being monitored is made possible.

Also unnecessary are sensors for recording and scanning the objects, supplemental to the light grid. These sensors would increase expenditure, as well as the spatial requirements for security surveillance, and might compromise the system's reliability. Moreover, surveillance is independent of the transit speed of the objects being monitored, with the result that the surveillance becomes simpler, without a loss of reliability.

It has proved advantageous to provide the number of feet that belong to the carrier and that require detection, and to trigger the security feature if, upon passage of the object through the light grid, the objects ends before the provided number of carrier feet has been detected or the number of carrier feet exceeds the provided number.

The number of carrier feet can be provided in a variety of ways. For example, it is possible to input the number upon startup of the system. Or it may be furnished by means of parameterization or configuration, e.g., with a PC user interface.

With respect to evaluating the uppermost and/or lowermost light ray blocked by an object passing through the light grid, evaluation can naturally be such that the first unblocked light ray above and/or below the object is examined. In actual practice, furthermore, particularly when the light grid has a large number of light rays and a small vertical spacing between them, not only is an uppermost and/or lowermost blocked light ray evaluated, but several vertically successive light rays around the contour-shape are also evaluated, in order to admit an area of vertical tolerance into the shape identification process. This reduces a susceptibility to interference in the security monitoring system.

The invention is next described in greater detail on the basis of a concrete embodiment and the attached drawings.

Figure 2:
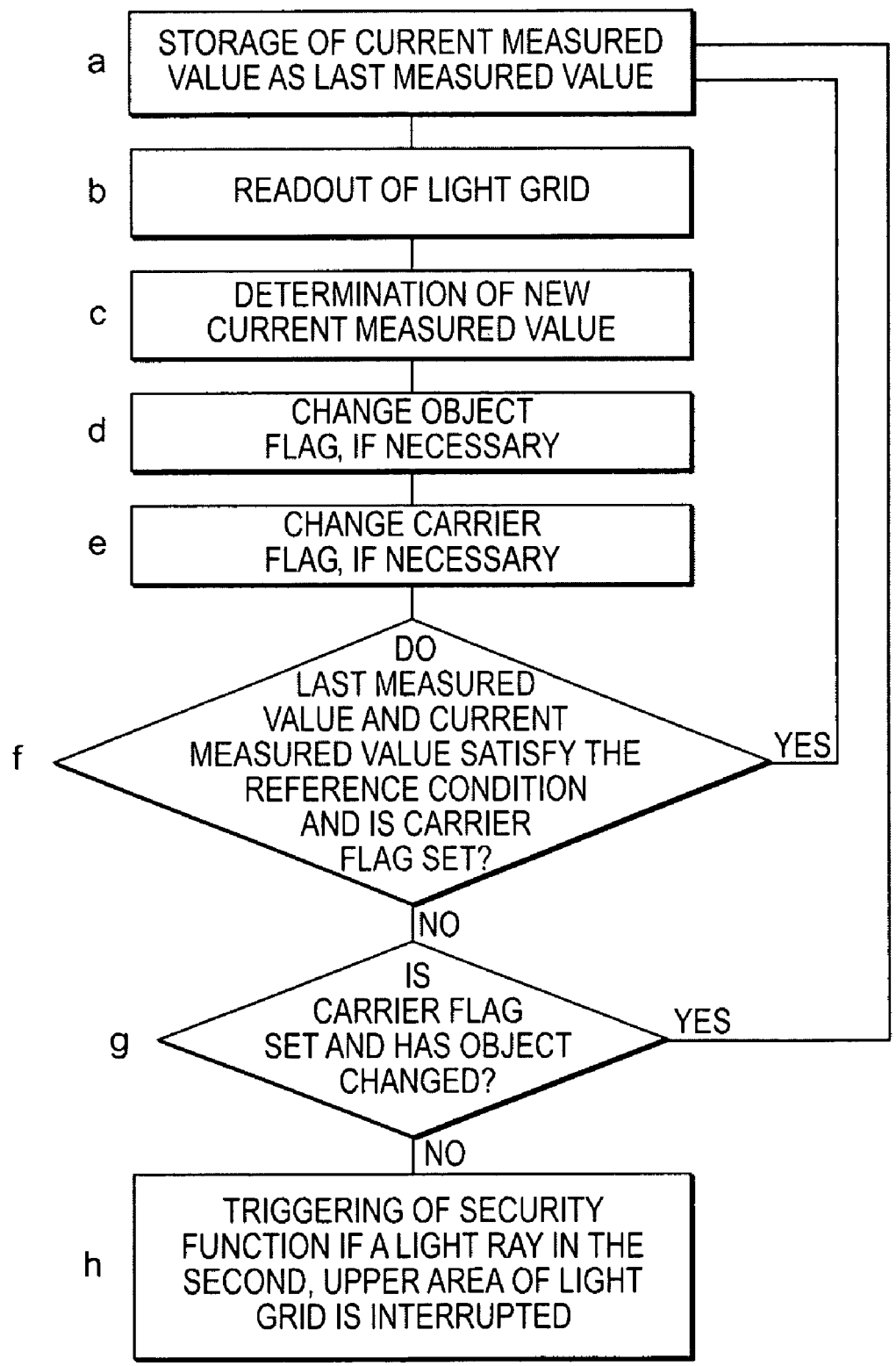

Shown are:

FIG. 1 a schematic depiction of a transport device, with a passageway protected by a light grid FIG. 2 the overall evaluation program, which is implemented by the evaluating circuit FIG. 3 scanning of the object passing through the light grid, depicted schematically The process and the device for monitoring the security of a danger zone is explained in the exemplary embodiment on the basis of a passageway through which cartons 14 of varying sizes are transported, e.g., for the purpose of shrink-wrapping in a foil, after being positioned on pallets serving as carriers 12.

From FIG. 1 it is clear that, despite the simplicity of the basic geometric shapes involved, the chosen example poses a challenging task for the security system, and one which systems belonging to the prior art fail to successfully address.

It is evident that successive configurations of carton 14 and carrier 12, i.e., the pallet, do not have a uniform pattern, either with respect to contour or cross-section, since the cartons 14 are of differing sizes. Even if standardized cartons 14 were used, it would be laborious to insure that the position of the standardized carton is always precisely the same relative to the pallet 12 (since if the position were not, the reference contour would also have to change). In contrast, the invention requires only a rough positioning, which is easy to achieve.

However, those systems in which the muting function is guaranteed by pre-positioned light barriers and which are more costly with respect to material and spatial requirements also fail in the present case, since they are critically dependent on the geometry of the configuration and on the transport speed. For the chosen example, a light barrier could not trigger the muting function over an interval of time designed for a specific carton length.

In present embodiment, carriers 12 are positioned on a transport belt 10 running in the direction of the arrow shown in FIG. 1, and each carrier 12 bears a carton 14 such that the size of the cartons 14 varies, as does the carton's position on the carrier 12. The transport belt 10 runs through a passageway, which is guarded by a light grid 16.

The light grid 16 consists of a vertical bar with transmitting units positioned on top of each other, and of a matching vertical bar positioned on the other side of the passageway, with corresponding receiving units positioned on top of each other. In an embodiment that takes the form of a reflective light barrier it is also possible to position both the transmitting and receiving units on the same side of the passageway and to position a reflective medium on the other side.

The transmitting units emit horizontal lights rays 22 that are spaced one above the other and that are received in the corresponding receiving units. For the sake of clarity, the light grid 16 in the drawing exhibits only a few light rays 22. In actual practice, light grids 16 are employed that have a considerably larger number of light rays 22, with a smaller vertical spacing between them, in order to provide the light grid 16 with greater resolution. In actual practice, light grids 16 are employed which have up to 240 light rays 22, depending on the height of the configuration.

The light grid 16 completely blocks the passageway leading to the danger zone. If the security monitoring system is active, all the light rays 22 emitted by the transmitting units reach the corresponding receiving units as independent light rays. This process is monitored in the evaluating circuit. Machines and apparatus located in the danger area are cleared for operation.

If one or a plurality of light rays are blocked, this fact is ascertained in the evaluating circuit and the evaluating circuit triggers a security feature, which may consist, e.g., in the emission of an alarm signal to the effect that, e.g., equipment and machines be shut off.

A muting function is provided to insure that this security feature is only triggered when an unauthorized object, particularly, e.g., a person, passes through the entrance protected by the light grid 16, but that it is not triggered when an admissible object, e.g., a carton 14, passes through the entrance. This muting function suppresses the triggering of the security feature if an object passing through the light grid 16, e.g., carton 14, is identified as an admissible object.

According to the invention, the light grid 16 is divided into a first, lower partial area 16a and a second, upper partial area 16b, such that when a light ray from the first, lower area 16a is blocked, the instance is registered, but is also muted.

The transmitting units and the receiving units are connected to the evaluating circuit in a manner that is known to the prior art but that is not depicted here. The evaluating circuit controls and monitors the emission and reception of the light rays 22 and processes the light signals from the receiving units. In particular, information on the object's height is provided in the evaluating circuit and is emitted as a signal or measured value. This information is obtained from the position of the uppermost blocked ray of the second, upper area 16b of the light grid 16 or from the position of the lowermost unblocked ray of the same area 16b, above which all other light rays 22 are also unblocked. If no light ray 22 from the second, upper area 16b of the light grid 16 is blocked, a measured value of 0 is emitted.

In this process, the invention specifies that the last measured value recorded before the current measurement is stored in a first storage unit provided in the evaluating circuit. In each case, the current measured value that is being read out is brought into relation with this directly preceding, read-out value, and an examination is made as to whether the outcome satisfies an object-specific condition. In the case of the cartons 14, this condition states that the surface is flat within the tolerance limits, and thus that the measured values agree, or that the difference between them is virtually zero.

In addition, the evaluating circuit is so designed that an object flag is set in a second storage device, which is provided in the evaluating circuit, if the last determined measured value for the height of the carton 14 is zero and the current measured value for the height of the carton 14 differs from zero. The object flag is cancelled when the last determined measured value for the height of the carton 14 is different from zero and the current measured value is zero.

The evaluating circuit also provides a signal from which it can be determined if the ray path of light in the first, lower area of the light grid 16a has been interrupted.

When a carton 14 on a pallet 12 enters the light grid 16, the foremost part of the pallet is recorded in the first, lower area of the light grid 16a. Information indicating that the pallet was detected is stored in the third storage element provided by the invention in the evaluating circuit. From there on, this piece of information is designated "setting of carrier flag". The carrier flag remains in place until it is removed, and each renewed identification of a portion of the carrier will lead to the flag again being set in the storage element, even when it has already been set.

The condition for removing the carrier flag is that a carrier 12 is not detected by the first, lower area of the light grid 16a when an object flag is not set.

In particular, this system design permits the use of open or divided carriers 12 that have a number of feet 12a, as may arise for pallets that have a given number of feet with gaps between them.

In the second, upper area 16b of the light grid 16 the value 0 is read out constantly for the position of the current point of the object-contour as long as only a portion of the carrier 12 projecting below the carton 14 passes through the light grid 16. Thus even without muting there is no triggering of the security feature.

When the carton 14 positioned on the pallet 12 enters the light grid 16, a signal other than zero is produced in the second, upper area 16b of the light grid 16, and this signal must be muted to permit the passage of any object through the light grid.

In the present example, an 'admissible passage' is characterized by the fact the object does not project forwards over the carrier and the object has a uniform height. Other conditions may be applied, however.

For the condition just described, an examination is first made to determine whether a carrier flag has been set. If this is the case, the passage of the object might involve an admissible passage, even if the difference between the current value (the height of the object rim) and the last value (which is equal to 0) is significant.

To take this case into account a second storage element is provided, in which the 'object flag' can be set in order to indicate whether or not an object has been detected. If the object flag is set, this is a sign that a new object is entering the light grid 16. The event may again involve an admissible passage, with the result that there is a muting action and the security feature is not activated.

While the object continues through the light grid 16 a comparison is made for each value measured in the second, upper area 16b of the light grid 16 to determine whether the reference relationship with the previously measured value is fulfilled, i.e., in the present example, whether the values ascertained for height are identical. If they are, the signal is muted and the security function is not executed as long as the carrier flag is in position. Otherwise, the security feature is activated.

At the moment when the carton 14 has entirely passed through the light grid 16 a value of zero is read out in the second, upper area 16b of the light grid if the last measured value was significantly different from zero. The object flag is cancelled as a result. Cancellation of the object flag indicates that an object has completely traveled through the light grid and that muting has been performed and the safety feature has not been activated if the carrier flag is set.

In a preferred embodiment the cancellation of the object flag can be counted in a counter provided for that purpose. In particular, it is expedient to return this object counter to zero when the carrier flag has been cancelled. In this configuration it is possible to determine the number of objects on a given carrier and to associate the number with the activation of the safety feature when more than one object, or when a pre-established reference number of objects, are counted on a carrier. This would be done, e.g., in order to prevent someone from jumping on the back of a carrier and trying to deceive the security system by holding a board level above their head.

In the system described in detail above, the safety function has not been activated if a carrier ends before the object does. If this behavior is not desired but the special shape of the carrier, and particularly the number and position of the carrier feet 12a, are known, the evaluating circuit is enlarged to include another flag, which is called the change-in-structure flag. The evaluating circuit is also enlarged to include an appertaining storage unit and another counter, which here is called the structure counter. The change-in-structure flag is set for the first time when it was not set before and when a carrier 12 is detected in the first, lower area 16a of the light grid. It is cancelled when a carrier is not detected in the first, lower area 16a of the light grid 16. The structure counter is increased incrementally when the change-in-structure flag is newly set, and it is returned to zero when an object is not detected in either the first, lower area or in the second, upper area of the light grid 16 and the previously learned value has been reached for the number of carrier feet 12a which were to be detected.

The carrier flag is removed if the value stored in the structure counter has reached the number of carrier feet 12a to be detected. Since subsequent to this the flag will again be set if a carrier 12 is detected in the first, lower area of the light grid, the security function will again be suppressed as long as the last foot of a carrier 12 remains in the area of the light grid.

FIG. 2 takes the form of a decision tree and depicts the process followed in the control unit of the described embodiment.

In an initial step that is not depicted it is determined whether a previous measured value is present. This may be the case when, e.g., upon startup of the control circuit a negative value is shown in the storage for the last measured value. A signal of this kind can never be read out of the light grid according to the invention and may thus be used as an unambiguous sign that there is no last measured value. In this case a measured value is read out.

In the second step 'a' of the process, the current measured value is stored as the new last measured value. It is stored in the storage unit provided for that purpose in the evaluating circuit.

In the third step 'b', a new current measured value is determined by performing a measurement, i.e., by reading out all the receiving elements.

In a fourth step 'c', an examination is made as to whether it is necessary to change the object flag. To this end, an analysis is made to determine if there has been a drop to zero or and increase from zero between the last measured value and the current measured value. In the first case, the object flag is set; it the second case it is cancelled.

In the fifth step 'd', it is determined if the carrier flag has been set and the learned relationship between the current value and last measured value has been fulfilled. If this is the case, the object is admissible and the process reverts to the second step (step 'a').

Otherwise, the sixth step 'e' will be executed. Here an examination is made as to whether the carrier flag is set and the object flag has been changed. If this is the case, the change in the object flag indicates that the deviation from the reference contour characteristics for the object is being caused by the front or the back of the object. If this is the case, the object is admissible and the process reverts to the second step (step 'a').

If there has not yet been a reversion to an earlier step, in the seventh step 'f' the safety feature is triggered when a ray from the second, upper area 16b of the light grid 16 is interrupted. The system advantageously remains in this state until the hazard or disturbance has been removed and the system has been reset.

On the basis of FIG. 3 it is possible to reconstruct how the individual conditions for the transit of an admissible object are fulfilled at the points indicated by intersecting lines A to I.

Throughout the process, a state for which the signal output unit of the light curtain signals orderly transit is designated as 'green', while the signal for irregular transit, in which the safety feature would be triggered, is designated as 'red'.

At the moment when intersecting line A is located within the light grid 16, the first carrier foot 12a is registered in the first, lower area 16a of the light grid 16. This event is stored by setting a carrier flag. No 'red' signal is emitted, however, since all signals produced beneath the intersecting line J, which separates the first, lower area from the second, upper area, are muted. In a system employing a change-in-structure flag and a structure counter, the change-in-structure flag would also be set here, since it has not already been set and a carrier has been detected, and the structure counter would be incrementally increased, since the change-in-structure flag was newly set.

The carrier 12 accordingly travels further into the passageway.

At the point of intersecting line B, the first carrier foot 12a is again detected and the carrier flag is consequently set. In addition, the first point of carton 14 is now registered. Since the last measured value had a value of zero and an object flag was changed, the object movement is permitted; the signal remains green as a result and the carton continues its transit. The change-in-structure flag and the structure counter remain unchanged.

At intersecting line C, a signal continues to be produced by the first pallet foot 12a in the first, lower area 16a of the light grid 16, and the carrier flag is against set. If the height of the object, i.e., carton 14, remains constant with the tolerance limits, the signal remains green and the carton continues to enter. The change-in-structure flag and the structure counter remain unchanged.

At intersecting line D, a carrier foot 12a is no longer detected, with the result that the change-in-structure flag is cancelled. The carrier flag remains set, however, since the object flag is still set. Thus, the status again depends on whether the height of the object has remained constant within the tolerance limits. If this is the case, the signal remains green and the carton 14 continues its inbound transit. The value of the structure counter remains the same, since it is only increased when the change-in-structure flag is again set.

At intersecting line E, a signal is produced in the first, lower area 16a of the light grid 16 by a second carrier foot 12a, so that the already set carrier flag is again set. If this measuring point is the first at which the second carrier foot 12a is detected, the change-in-structure flag is again set and the structure counter is incrementally increased. If the height of the object remains constant within the tolerance limits, the signal remains green and the carton continues its inbound transit.

At intersecting line F, the same account applies as for line D, without the change-in-structure flag being set, however, and without an incremental increase in the structure counter.

At intersecting line G, the same account applies as for line E, except that the signal in the first, lower area 16a of the light grid 16 is now produced by the third carrier foot 12a. In the interim, a gap between the pallets has been detected and the change-in-structure flag has consequently been cancelled and set again and the structure counter has been increased to a value of 3.

At intersecting line H, the object has just left the light grid 16 and the first point no longer belonging to the carton 14 is registered. Since the current measured value has a value of zero and the previous value differed significantly from zero, the object flag is cancelled. If the carrier flag is set (which is the case) and an object flag was changed, the movement is permitted. Moreover, the number of carrier feet 12a is still in agreement with the learned reference value, which for the present pallets equals 3. The signal therefore remains green, and the carton 14 continues its inbound transit. The change-in-structure flag and the structure counter remain unchanged.

At intersecting line I, nothing is registered in the second, upper area 16b of the light grid 16. The signal therefore remains green, and the carrier 12 continues inwards.

At the end of the pallet, the change-in-structure flag is cancelled, since a carrier 12 is no longer detected. The structure counter is returned to zero, since an object is no longer detected in either the first, lower area 16a or the second, upper area 16b of the light grid 16 and the previously learned value has been reached for the number of carrier feet 12a which were to be detected.

LIST OF REFERENCE NUMERALS 10 conveyor belt
12 carrier
12a carrier foot
14 carton
16 light grid
16a first, lower area of light grid
16b second, upper area of light grid
22 light rays

The invention claimed is:
1. Process for monitoring a passageway through which objects on carriers are transported, the process comprising at least one light grid with a plurality of light rays running one above the other guarding the passageway, wherein the light grid has a first, lower area, through which the carriers pass and a second, upper area, through which the objects pass, which light grid possesses an evaluating circuit which emits a signal in response to interruption of a light ray in the first, lower area and provides information on the height of the object, which process comprises the following steps:
   a) storing a current value for the height of the object as a last measured value;
   b) generating a readout of the first, lower area of the light grid to determine whether a carrier has passed through the light grid and generating a readout of the second, upper area of the light grid;
   c) determining a new current value for the height of the object from the data read out from the second, upper area of the light grid;
   d) in the case of the last measured value having a value of zero within a tolerance range and a current measured value differing from zero beyond the tolerance range, setting of an object flag to indicate location of an object within the light grid, in the case of the last measured value differing from zero within the tolerance range and the current measured value having a value of zero within the tolerance range, cancelling the object flag, and determining whether the object flag has changed;
   e) in the case of detection of a carrier in the first, lower area of the light grid setting of a carrier flag and in the case of non-detection of a carrier in the first, lower area of the light grid and the object flag not set, cancelling or not setting the carrier flag;
   f) determining whether the current measured value and the last measured value satisfy a predetermined condition and reverting to step a) in the case of the current measured value and the last measured value satisfying said predetermined condition with the carrier flag set;
   g) reverting to step a) in response to a set carrier flag and a changed object flag; and
   h) executing a security function in response to interruption of a light ray from the second, upper area of the light grid.

2. Process according to claim 1, wherein
the information issued on the height of the object is correlated with the highest light ray which is interrupted by the object in its current position or is correlated with the lowest light ray which is not interrupted by the object in its current position and above which there is no interrupted light ray.

3. Process according to claim 2, wherein
the predetermined condition that is checked for in step f) comprises agreement of the current measured value with the last measured value, within a pre-established range of error.

4. Process according to claim 3, wherein
a number of feet belonging to the carrier is learned at the beginning of the first process run, after startup of the system.

5. Process according to claim 3, wherein
a number of feet belonging to the carrier is preset by the parameterization or configuration.

6. Process according to claim 3, wherein
a number of feet belonging to the carrier is preset by the parameterization or configuration by means of a PC operator interface.

7. Process according claim 2, wherein
a number of feet belonging to the carrier is learned at the beginning of the first process run, after startup of the system.

8. Process according to claim 2, wherein
a number of feet belonging to the carrier is preset by the parameterization or configuration.

9. Process according to claim 2, wherein
a number of feet belonging to the carrier is preset by the parameterization or configuration by means of a PC operator interface.

10. Process according to claim 1, wherein
the predetermined condition that is checked for in step f) comprises agreement of the current measured value with the last measured value, within a pre-established range of error.

11. Process according to claim 10, wherein
a number of feet belonging to the carrier is learned at the beginning of the first process run, after startup of the system.

12. Process according to claim 10, wherein
a number of feet belonging to the carrier is preset by the parameterization or configuration.

13. Process according to claim 10, wherein
a number of feet belonging to the carrier is preset by the parameterization or configuration by means of a PC operator interface.

14. Process according to claim 1, wherein
a number of feet belonging to the carrier is learned at the beginning of the first process run, after startup of the system.

15. Process according to claim 14, further comprising
setting a change-in-structure flag between step (c) and (d) of the process if it was not already set and if a carrier is detected in the first, lower area of the light grid;
cancelling the change-in-structure flag if no carrier is detected in the first, lower area of the light grid;
incrementally increasing a structure counter if the change-in-structure is newly set;
removing the carrier flag if the value stored in the structure counter exceeds the learned number of carrier feet to be detected; and
returning the structure counter to zero if there is no object detected either in the first, lower area or in the second, upper area of the light grid and if the previously learned value is reached for the number of carrier feet to be detected.

16. Process according to claim 1, wherein
a number of feet belonging to the carrier is preset by the parameterization or configuration.

17. Process according to claim 16, further comprising
setting a change-in-structure flag between step (c) and (d) of the process if it was not already set and if a carrier is detected in the first, lower area of the light grid;
cancelling the change-in-structure flag if no carrier is detected in the first, lower area of the light grid;
incrementally increasing a structure counter if the change-in-structure is newly set;
removing the carrier flag if the value stored in the structure counter exceeds the learned number of carrier feet to be detected; and
returning the structure counter to zero if there is no object detected either in the first, lower area or in the second, upper area of the light grid and if the previously learned value is reached for the number of carrier feet to be detected.

18. Light grid with an evaluating unit for implementing a process according to claim 1.

19. Process according to claim 1, wherein
a number of feet belonging to the carrier is preset by the parameterization or configuration by means of a PC operator interface.

* * * * *